(No Model.) 2 Sheets—Sheet 1.
E. C. F. OTTO.
VELOCIPEDE.
No. 352,885. Patented Nov. 16, 1886.
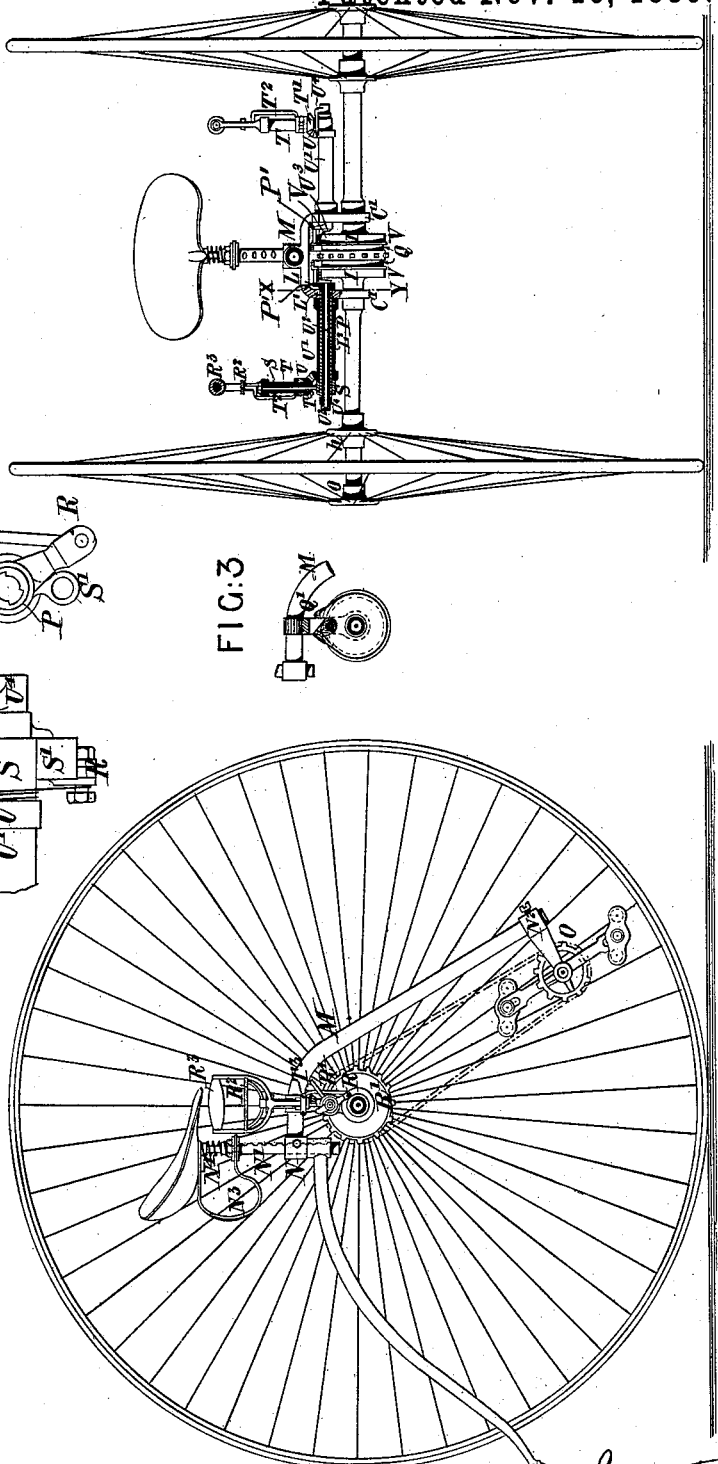
Witnesses
Chas H Smith
J Stait
Inventor
Edward C. F. Otto.
per Lemuel W. Serrell
atty

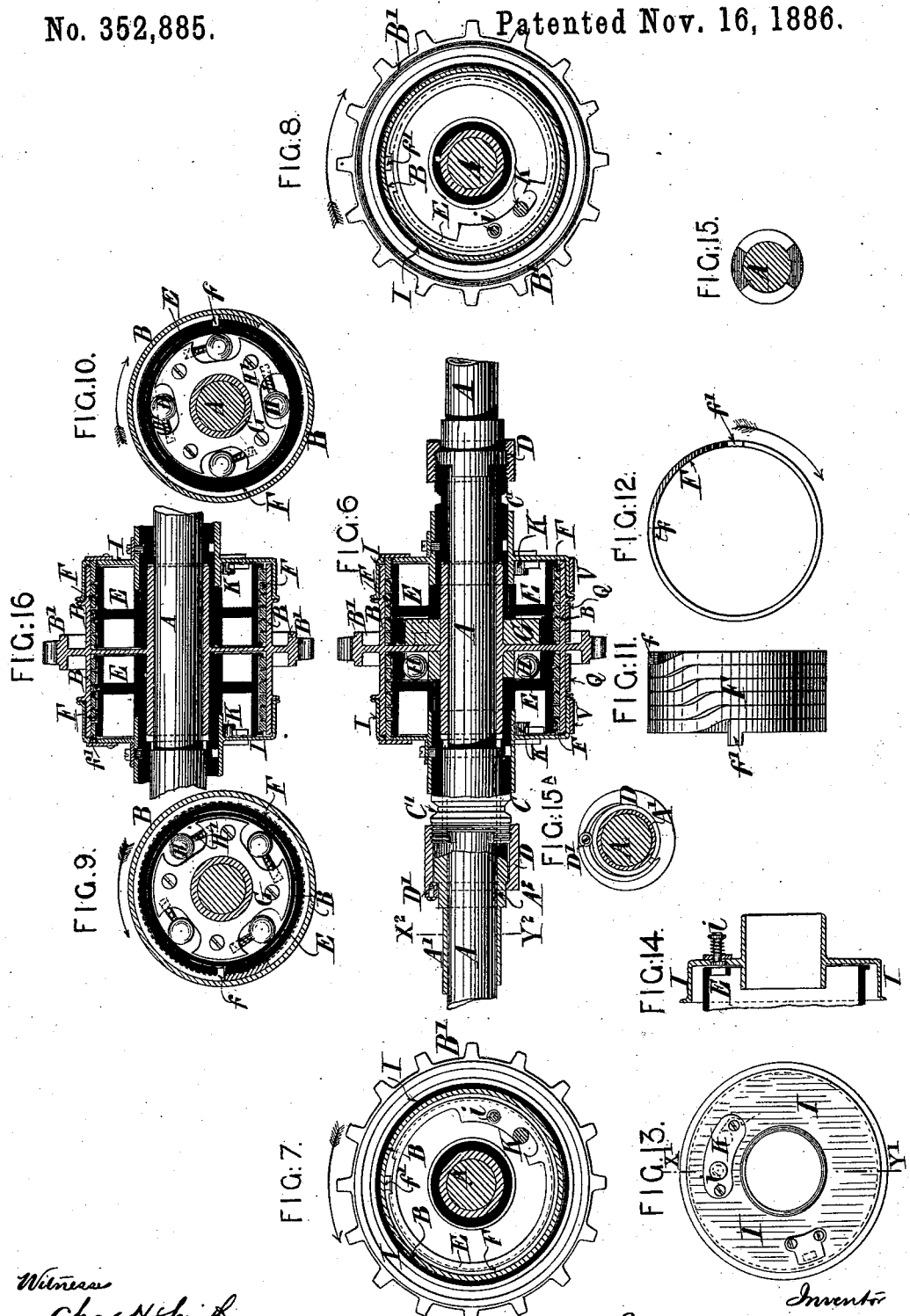

United States Patent Office.

EDWARD CHARLES FREDERICK OTTO, OF PECKHAM, COUNTY OF SURREY, ENGLAND.

VELOCIPEDE.

SPECIFICATION forming part of Letters Patent No. 352,885, dated November 16, 1886.

Application filed January 4, 1886. Serial No. 187,579. (No model.) Patented in England October 7, 1884, No. 13,291.

*To all whom it may concern:*

Be it known that I, EDWARD CHARLES FREDERICK OTTO, a subject of the Queen of Great Britain, residing at Peckham, in the county of Surrey, England, have invented certain new and useful Improvements in Velocipedes, of which the following is a specification.

My improvements are applicable to velocipedes in general.

One part of my invention consists in a clutch which is applicable for driving purposes and for driving and steering purposes. This clutch consists in a coil-spring in a drum, and in connection therewith I apply brakes for steering purposes.

Another improvement refers to a mode of fixing wheels, pulleys, and other parts to axles or other parts of velocipedes.

These improvements will be better understood by describing their application to a central-driving Otto bicycle, which is shown in side elevation in Figure 1, and in part sectional front elevation in Fig. 2. Fig. 3 is a vertical longitudinal section through the line X Y, Fig. 2. Fig. 4 is a detail front view, and Fig. 5 an end view, of lower part of steering-handle gear. Fig. 6 is a vertical longitudinal section through the middle or clutch part of a centrally-driven road-wheel axle; Fig. 7, a left-hand sectional end view, and Fig. 8 a right-hand sectional end view, of exterior or end part of clutch-gear. Figs. 9 and 10 are left-hand and right-hand sectional end views of middle part of clutch-gear. Fig. 11 is a plan, and Fig. 12 an end view, of a clutch-spring. Fig. 13 is an end view, and Fig. 14 a vertical longitudinal section through an inclosing-end cap for the clutch-gear. Figs. 15 and 15$^A$ are sectional end views of connecting-coupling. Fig. 16 is a longitudinal section through a modified form of clutch.

The clutch-gear is illustrated more especially in the large-size views, Figs. 6 to 14, but also shown to a smaller scale in Figs. 1, 2, and 3. It forms a perfect, instantaneous, and absolute clutch, while at the same time allowing the wheels to move freely in the opposite direction, or the pedals to be at rest. This clutch is constructed in the following manner:

On the inner axle, A, and in the center of the machine, I mount a drum, B, which can turn freely on the axle A, and which has a central web, as shown, which on the outside is provided with a recessed or tooth rim, B', for receiving the driving-band, with bars which take their place in the recesses of the pulley-rim. The inner tubular axle, A, is continued right through the outer tubular axle, A'. One road-wheel is fixed on one end of the inner axle, A, and the other road-wheel is fixed on the outer end of the outer axle, A', which latter I make in length a little less than half the width of the vehicle. Onto this outer axle, A', in the place where one of the two bearings of the central Otto patent swinging frame is to be provided, I braze on a sleeve or form a thickened part, A$^2$, formed with recesses, as shown in the end view, Fig. 15, and I push onto the axle A' the ball-bearing sleeve C, which at the end is provided with corresponding tongues, and I unite the two parts by means of a thin nut-ferrule, D, or socket, which is milled or formed with a notch or otherwise, for a key or spanner to fit on. The nut D may be fitted with a catch-spring, D', having a peg or catch at its outer end, which drops into a recess in the sleeve A$^2$, or thickened part on the axle, thus preventing the nut D from getting loose. At the same time any inexperienced person may in a few minutes detach or attach such part; or where such great strength is not required I may use a set-screw instead of the screwed ferrule D for keeping the parts together. This means of connecting is applicable to the fixing of wheels, pulleys, and other parts to axles and other parts of velocipedes, and instead of the usual means—such as feather, key, or set-screw—and my mode of fastening is of particular value for securing parts to light tubular axles or other tubular parts where the application of key or feather or of sweating is unreliable.

The sleeve C of the ball-bearing is continued nearly to the center of the machine, and carries on its end an inner drum or pulley, E, on which I fix a coiled spring. This spring F is in Figs. 11 and 12 shown of a special form, which I prefer; but it may, if desired, be of ordinary cylindrical, helical, or spiral form.

It consists of several coils or convolutions in which one coil is connected to the next coil by a continuation or junction part in such manner that the coils do not run slanting or form a helix, but run at right angles to the axis, except at the aforesaid places of junction. Similar ball-bearing sleeve C, coupling D, inner drum, E, and spring F are arranged on the other side of the center of the machine and in connection with the other or inner axle; but the coils of the spring F run in the opposite direction—that is to say, the spring for the right wheel is a right-handed spring, and the spring for the left wheel is a left-handed spring. A peculiarity in the action of coil-springs applied as clutches is this, that the power applied to propel the vehicle tends to expand the springs to a greater diameter than that of the drum which contains it, if that were possible, and this power is therefore transferred to the driving-wheels.

I fix one end, $f$, of the spring F on the inner mandrel or drum, E, which is provided with a corresponding hole, as shown in Figs. 9 and 10. The spring-ring is surrounded by the drum or rim B and suitable gear is provided for causing the spring to be contracted for steering purposes, while in its normal state it is expanded or extended. In such machines in which no back-pedaling is required, as in the "Cheylesmore," I may fasten the spring-ring F at only one end to the drum or other part fixed on the axle, and in such manner that the other end of the spring will be opened or tend to become enlarged when the outer drum or driving-box in which the spring is contained is turned by the forward motion of the pedals; but in some velocipedes, such as the Otto bicycle, or in ordinary tricycles in which the machine can be driven backward, a single spring, say, of six coils for a driving-wheel, and having no piece $f$, as hereinbefore described and shown, may be fixed by its central ring or coil by means of a pin, screw, or otherwise to its inner mandrel, E. The outer half of the coils is then used for driving, and the inner half for back-pedaling. In the modification, Fig. 16, a centrally-fixed coil-spring, F, is shown applied on each mandrel-drum E.

If I desire to use the whole of the spring for driving purposes, I fasten the spring, as here shown in Figs. 6 to 12, and place inside the drum E either a similar ring-clutch, or, as here shown, combine therewith an improved form of Cheylesmore clutch. This latter consists of a hardened steel disk, G, which is cut out in the manner shown at Figs. 9 and 10 and containing hardened steel balls H, which, by means of volute or other springs H', are kept in position and jam between the inclined planes formed in the disk G and the inner periphery of the inner drum, E, which is lined with hardened steel. Fig. 9 is an outside view of the left-hand clutch and Fig. 10 of the right-hand clutch.

As already stated, one end of the spring is, in the example shown in the drawings, by the lug $f$ connected to the inner drum, E. The other end of the spring is formed into a projection, $f'$, Figs. 6, 7, 8, 11, and 12, which passes into a recess or hole in the brake drum or cap, I, which latter is mounted so as to turn freely on the ball-bearing sleeve C. This latter is fixed on the axle, or, rather, one on each axle. The rim of this brake-drum I passes over part of the driving-pulley drum B, Fig. 6, at each side thereof. I also connect each cap I with the mandrel drum E, on which each coil-spring is fixed by means of a carrier peg or bolt, K, having so much circumferential play as to allow the cap I, when the brake is applied thereto, to wind up the coils from the loose end to the other end, thus by degrees releasing its hold against the inside of the driving-pulley drum B, while it is tightened on the coil mandrel-drum E. Then the carrier-peg K begins to act upon the drum E, and thereby on its respective road-wheel, and begins to retard that wheel. The other coil-spring is meanwhile driving. It will thus be seen that back-pedaling would be impossible were it not for the internal clutches, G, or other equivalent clutches. When the machine is driven backward, the balls jam, as already explained, and prevent overrunning of the road-wheel in question, thus securing, even when back-pedaling, the correct steering of the machine. In order to disengage a driving-wheel when a machine is left standing unoccupied, I provide each brake-cap I with a small peg, $i$, having a milled head and with a spiral spring underneath. When this peg is pushed into a recess or hole formed in an inner flange part of the mandrel-drum E, after the coil-spring F has been wound up or released from the driving-pulley drum B, the peg $i$ keeps the spring thus coiled, and leaves the whole free to move one way, so that the machine can be pushed along by hand. When the peg $i$ is pulled quite back or out, as shown, the spiral spring keeps it out of the hole in the flange of the drum E.

In the modification, Fig. 16, I connect the last outer coil of the coil-springs F on each side with the aforesaid caps I by a projection, $f'$, from the spring F passing into a recess in the cap I. I also in this case connect each cap I with the mandrel-drum E by means of a carrier peg or bolt, K, having so much circumferential play as to allow the cap I, when the brake is applied thereto, to wind up the coils from one side up to the center of the coil, thus releasing its hold against the inside of the driving-pulley drum B while it is tightened on the coil-mandrel-drum E. Then the carrier-peg K begins to act upon the outer coil-inclosing drum, B, which, being fixed on the wheel-axle in question, begins to retard that wheel. Simultaneously the other half of the same coil-spring F is contracted on its mandrel-drum E by the action of the pulley-driving drum B' upon it, and at the same time preventing overrunning of the road-wheel in question, and securing, even when back-pedaling, the correct steering of the machine.

Back-pedaling does not affect one wheel but always both, and simply retards the motion of the machine; or, instead of fastening the coil-spring to an inner mandrel, I may of course fasten it to an outer drum and drive the reverse way, so that the spring, by suitable gear, is caused to adhere to the mandrels. The spring may also, if desired, be made of gradually-decreasing section or strength, so as to wind up more gradually.

Instead of the ball or other clutches, I may apply a balance-gear of any suitable and well-known construction.

The bridge or fork part of the swinging frame L, Figs. 1 and 2, which is mounted on the two aforesaid ball-bearings C', forms the means of attachment for the parts that serve to work the aforesaid clutches and brakes; but in the case of an ordinary tricycle, such parts would be fixed to the framing of the machine. The center of the bridge L is provided with an eye for fixing thereto the frontal bone, M, which near the eye is knee-shaped, and contains at the upper end a bracket, N, for the reception of the tubular seat-spring pedestal, N', and at the lower end the fork end $N^2$, for the reception of the driving or pedal pulley O, which, like the other pulley, B, on the wheel-axle, is formed with recesses and teeth, as described, for the band. To the seat-spring pedestal N' is fixed a spring, $N^3$, forming the curved part of the letter D, the upper end of which spring carries the seat. Between the upper part of the spring $N^3$; I provide a helical or Oliver spring, $N^4$, to limit the movement of the spring $N^3$, and resting on an inner bar sliding or screwed in the pedestal N', by which means I can regulate the strength of the springs.

The two sides of the bridge of the swinging frame L, just above the ball-bearings, are provided with tubular bosses L', in which I fix tubes $L^2$, for the reception of the steering-handles and other mechanism. These tubes $L^2$, forming part of the frame, contain each an inner tubular rod, P, which rods in their inner ends, under the bridge, carry levers P'. To these levers I connect one end of the aforesaid inner or retarding brake-bands, Q, the other end of such brake-bands being fixed by hinges to a bolt, Q', which passes from one side of the bridge to the other, and is steadied in the middle by a bracket on the bridge. (Not shown, for the sake of clearness of the other parts.) The outer end of the aforesaid tubular rods P carry levers R, Figs. 4 and 5, which, by connecting-rods R', are acted upon by the finger-plate handles $R^2$, in the stirrup-shaped steering-handles $R^3$. The outer ends of the aforesaid tubes $L^2$, forming part of the frame, have fixed thereon at each end a standard, S, formed with an eye, which is fixed on the tube $L^2$, and is provided with recesses on one side, the tube being provided with corresponding tongues; and I keep the parts together by a set-screw, as already described with reference to the fixing of the ball-bearing sleeves. The standards S are round and tapered thinner at their upper end, and on each standard I mount a long sleeve or tube, T, with a corresponding taper hole, and provided at the bottom with a bevel-wheel, T', and at the top with the stirrup-shaped handle $R^3$. On the said sleeve or tube T, I mount a tubular sliding link, $T^2$, to which I, by a collar, $T^3$, around it, connect the aforesaid lever R, fixed to the inner tube, P, by means of the connecting-rod R', jointed to the said collar $T^3$. The sliding link $T^2$, at the top, carries the finger-plate $R^2$, which is guided on the sides of the stirrup-handle $R^3$. The finger-plates $R^2$, in both the stirrup-handles $R^3$, form the means for actuating the brakes for stopping the machine.

In gear with each of the aforesaid bevel-wheels T', I provide a bevel-wheel sector, U, which is fixed on a tube sleeve, U'. This latter is mounted so as to turn on the tube $L^2$, that is rigidly fixed to the bridge of the swinging frame. Inside the sleeve P a rod, $U^2$, is passed, and on the end nearest the bridge I fix a lever, $U^3$, to which is jointed one of the brake-steering bands V, which acts on the aforesaid brake-caps I, and serves to wind up the coil-springs F on their mandrel-drum E, and thus disengage the road-wheel in question. The other ends of these two steering brake-bands V are connected to the same fixed bolt Q' as the other brake-bands. The lever $U^4$ is fixed on the same spindle $U^2$, and connected to the bevel-wheel sector U, which is actuated by the bevel-wheel T'. This is fixed to the lower end of the movable stirrup-handle $R^3$. All the brake-band levers are held in their normal position by springs or other appliances arranged on the bridge. In order to be able to conveniently carry luggage and lamps, I provide the aforesaid steering-handle standards S with lower eye-brackets, S', for receiving hooks or rods for carrying luggage or lamps, and these rods can be adjusted so as not to interfere with the convenience of the rider.

I claim—

1. In a velocipede, the coil-springs, F, mounted on and connected to mandrel-drums, which are fixed each on its road-wheel axle A A', in combination with an outer driving-drum, B, which incloses the springs F, and is provided with brake-bands Q, and in combination with caps I, fixed each on its road-wheel axle A A' and provided with brake-bands V, and in combination with means for actuating the brake-bands Q and V, so that the coil-springs F are wound up or released by the steering-brakes V, and the driving power, while tending to enlarge still more the expanded coil-springs F to a greater diameter than that of the drum E, if that were possible, is transmitted to the driving-wheels, and in combination with clutches within the drums E, substantially as set forth.

2. In a velocipede, the coil-springs F, in combination with the mandrel-drums E on axles A A', the driving-drums B B', brake-bands Q, caps I, brake-bands V, and means for actuating the brake-bands Q and V, with the swing-frame M N², mounted centrally on the axles A A' and provided with pedals and driving-pulley O, and endless band which takes onto the driving-drum B B', substantially as set forth.

3. The coiled spring-clutches F and the mandrel-drums E, on which said springs are mounted, in combination with an outer inclosing driving-drum, B, and the brake mechanism, substantially as and for the purposes set forth.

4. In a velocipede, the combination, with the driving-drum B, the brake-cap I, encircling the end of the driving-drum, the brake-band V around the cap I, and the spring-clutches F within the drum B, and the tube L² and standard S, connected together and to the frame of the machine, of the handle R, to be rotated, the tube T, surrounding the standard S, and to which the handle is connected, the bevel-wheel T', surrounding the tube T, the sleeve U', surrounding the tube L², the sector U around the sleeve at one end and meshing with the wheel T', the rod U² within the tube L², its lever U⁴, connected with the sector U, and its lever U³, to which the brake-band V is connected, substantially as specified.

5. In a velocipede, the combination, with the axle A, driving-drums B B', and the sleeves C around the axle, of the drums E upon the sleeves C, the caps I, encircling the ends of the drum B, the spring-clutches F, one end of each of which is connected to the drum E and the other end to the caps I, the brake-bands around the caps I, and means, substantially as specified, for operating the brake-bands, the notched disks G within the drums E, the steel balls H, and springs H' within the notches, whereby one wheel can be turned and the other held stationary, substantially as specified.

6. In a velocipede, the combination, with axle A, outer axle, A', and its thickened portion A², having tongues and recesses on one end, of the ball-bearing sleeve C, provided at one end with tongues and recesses corresponding and interlocking with those upon the end of A', the nut-ferrule D, screwing upon the sleeve C and having a flange to bear against the edge of the portion A² in clamping the parts, and a catch-spring, D', to prevent the nut-ferrule D unscrewing, substantially as specified.

EDWARD CHARLES FREDERICK OTTO.

Witnesses:
WALTER J. SKERTEN,
G. W. WESTLEY,
*Notary's Clerks, 17 Gracechurch St., London, E. C.*